(12) United States Patent
Brightwell et al.

(10) Patent No.: US 6,831,949 B1
(45) Date of Patent: Dec. 14, 2004

(54) SWITCHING COMPRESSED VIDEO BITSTREAMS

(75) Inventors: Peter John Brightwell, London (GB); Stephen John Dancer, Hampshire (GB); Philip Nicholas Tudor, Surrey (GB); Nicholas Dominic Wells, East Sussex (GB); Oliver Hartwig Werner, Laatzen (DE)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 09/463,022

(22) Filed: Aug. 4, 2000

(30) Foreign Application Priority Data

Jul. 18, 1997 (GB) ............................................. 9715237

(51) Int. Cl.[7] .............................................. H04N 7/12
(52) U.S. Cl. ............. 375/240.12; 375/240; 375/240.01; 375/240.13; 375/240.15; 375/240.16; 375/240.25
(58) Field of Search ...................... 375/240.12, 240.13, 375/240.15, 240.25, 240.26, 240, 240.16, 240.05, 240.01; 386/4, 109; 704/200.1; 370/487

(56) References Cited

U.S. PATENT DOCUMENTS

| 5,191,414 A | | 3/1993 | Sugiyama | |
|---|---|---|---|---|
| 5,495,291 A | * | 2/1996 | Adams | 375/240.25 |
| 5,651,090 A | * | 7/1997 | Moriya et al. | 704/200.1 |
| 5,703,651 A | * | 12/1997 | Kim et al. | 375/240.13 |
| 5,732,183 A | * | 3/1998 | Sugiyama | 386/4 |
| 5,841,942 A | * | 11/1998 | Sugiyama | 386/109 |
| 5,917,830 A | * | 6/1999 | Chen et al. | 370/487 |
| 5,982,436 A | * | 11/1999 | Balakrishnan et al. | 375/240.05 |
| 6,025,878 A | * | 2/2000 | Boyce et al. | 375/240.16 |
| 6,137,834 A | * | 10/2000 | Wine et al. | 375/240 |
| 6,567,471 B1 | * | 5/2003 | Yoshinari | 375/240.26 |

FOREIGN PATENT DOCUMENTS

| EP | 0 590 974 | 4/1994 |
|---|---|---|
| EP | 0 656 729 | 6/1995 |
| WO | WO 95/35628 | 12/1995 |
| WO | 97 08898 | 3/1997 |
| WO | WO 98/03017 | 1/1998 |

OTHER PUBLICATIONS

"Splicing MPEG Video Streams in the Compressed Domain", by Wee et al., 1997 IEEE 1st Workshop on Multimedia Signal Processing, Jun. 23, 1997, pp. 225–230.

* cited by examiner

*Primary Examiner*—Chris Kelly
*Assistant Examiner*—Allen Wong
(74) *Attorney, Agent, or Firm*—McDermott Will & Emery LLP

(57) ABSTRACT

An MPEG bitstream is switched in the video domain in between a decoder and recoder pair which remain continuously in operation but which are transparent through re-use in the recoder of coding decision taken in the upstream coding of the MPEG bitstream and inferred in the decoder of the switch. Around the switch point, the coding decisions are modified.

28 Claims, 2 Drawing Sheets

SWITCHING COMPRESSED VIDEO BITSTREAMS

This invention relates to the field of compressed digital video

As compressed video bitstreams increasingly find their way into the programme chain, techniques for their manipulation are required. One of the most important techniques is the ability to switch between two compressed signals. This is typically required for editing of programmes; this involves switching between different "shots", each of which will be a section from a bitstream. This may be done in real-time or non-real-time. Switching is also required in continuity/presentation, involving real-time switching between different studios-or other sources, and for local/regional "opt-out", that is to say switching from a network signal to regional or local programmes or commercials.

Switching of analogue video signals, or of non-compressed digital signals, is relatively straightforward to carry out, as suitable times for switching (called "switching points" here) occur at regular intervals, typically during picture blanking. This is not the case with compressed signals, in which pictures often occupy a variable amount of time and/or bits. Furthermore the compression system may employ temporal prediction, which further complicates switching.

A simple way to switch bitstreams is to decode them, switch in the uncompressed domain, and re-code. This gives good flexibility, but the cascading of coding operations causes loss of picture quality. This can be a serious problem for some types of compression system, where there are many parameters and coding decisions that could be taken differently on re-coding. MPEG-2, currently the most important compression system for broadcasting, is such a system. This invention is intended primarily for MPEG-2 but can be used for other compression systems One prior approach to switching without loss of quality is what is known as "transport stream splicing". This involves defining points (called "splicing points") in the input bitstreams (in MPEG transport stream form) at which they can be switched directly. Two variations have been proposed: "seamless splicing" and "non-seamless splicing".

Splicing is potentially inexpensive to implement, as there is no need to decode or re-code the video. However it lacks flexibility for several reasons.

The switch can only occur at certain times, determined by the MPEG Group of Pictures (GOP) structure. The frame before the switch must be an I- or P-frame and the frame after it must be an I-frame. This typically means that the switch can only be specified to about half a second of resolution.

The video switching point determines when any corresponding audio is switched, because the video and audio are part of a single transport stream. It is not possible to have independent video and audio switching points.

The upstream coders must know when switching may be required; if they do not, they might have to insert a large number of splicing points.

A coder producing a bitstream with seamless splicing points may have to compromise its coding performance to insert these points. This is because the buffer trajectory of a downstream coder must be exactly fixed at the splicing points, making the rate control requirements of the coder more difficult, especially if there are a large number of splicing points. A proposal has been made to get round this problem by inserting synthetic fade-in sequences around the switching points, but this restricts the usefulness of splicing. Transitions other than simple cuts (ie cross-fades) are not possible.

Another approach is to switch and re-code the decoded inputs but not make use of the full set of coding options available, for example, within the MPEG-2 "toolset". By reducing the number of decisions and parameters that can change on re-coding, the amount of additional distortion introduced is reduced. One prior proposal makes use of this idea, by employing a relatively simple GOP structure of IBIBIBIB (c.f. IBBPBBPBBPBBIBBP . . . which is typically used). The drawbacks of this approach are that restricting the coding options tends to require a higher bitrate for the same picture quality, and that it introduces incompatibilities with other coding equipment using the full range of options.

An earlier BBC patent application, WO 97/08898 described a bitstream switch using a decode-switch-re-code approach, but in this case, the decoder produced an additional output, giving the coding decisions used by the original coder. By using the same decisions on recoding, the additional degradation introduced would be small. This switch also included bypass paths, used many frames away from the switching point, which ensure that the switch can be made completely transparent, but the use of these complicates the operation of the switch.

It is an object of the present invention to provide improved methods and apparatus for the switching of compressed video bitstreams.

Accordingly, the present invention consists in one aspect in apparatus for the switching of compressed video bitstreams comprising a first decoder for receiving a first input bitstream and providing a first decoded video signal and a first coding decision signal; a second decoder for receiving a second input bitstream and providing a second decoded video signal and a second coding decision signal; a video switch for switching between said first and second video signals; a coder for re-coding said switched video signal and coding decision processing means for receiving said first and second coding decision signals and delivering coding decisions to said coder, such that in the steady state said decoding and re-coding is substantially transparent.

It has been shown that for re-coding using the same coding decisions, the additional distortion introduced is negligible under normal circumstances. Thus the decoder and re-coder can be kept "in-circuit" at all times, simplifying the switch.

The coding decision information may include: picture dimensions; frame rate; picture structure (frame-coded or field-coded); picture type (I,P or B); whether macroblocks are intra-coded or use prediction; whether forward, backward or bi-directional prediction is used; motion vectors; quantiser visibility weighting matrices; quantiser step and buffer state of a downstream decoder.

Advantageously, said coding decision processing means serves around the switching point to modify coding decisions for re-coding. In particular, the refresh strategy may be modified on recoding, by moving the recoding I-frames as P-frames, and/or vice versa, or by use of a "I-P pair" of MPEG field structure pictures. The purpose of this is to prevent the downstream decoder's buffer from becoming too full or empty, due to I-frames coming too far apart or too close together in the switched bitstream.

Advantageously, underflow of a downstream decoder buffer is avoided through reduction of bitrate for frames adjacent the switching point. A psycho-visual effect known as "temporal masking" can be employed to prevent the downstream decoder's buffer from becoming too empty.

Quantisation noise in the frames very close to the switching point is often not visible to the observer and so the number of bits used in these frames can be deliberately reduced.

Preferably, said coding decision processing means receives buffer occupancy information such that the bit usage in the input bitstreams is taken into account in the re-coder's rate control algorithm.

The invention will now be described by way of example with reference to the accompanying drawings, in which.

Figure 1:
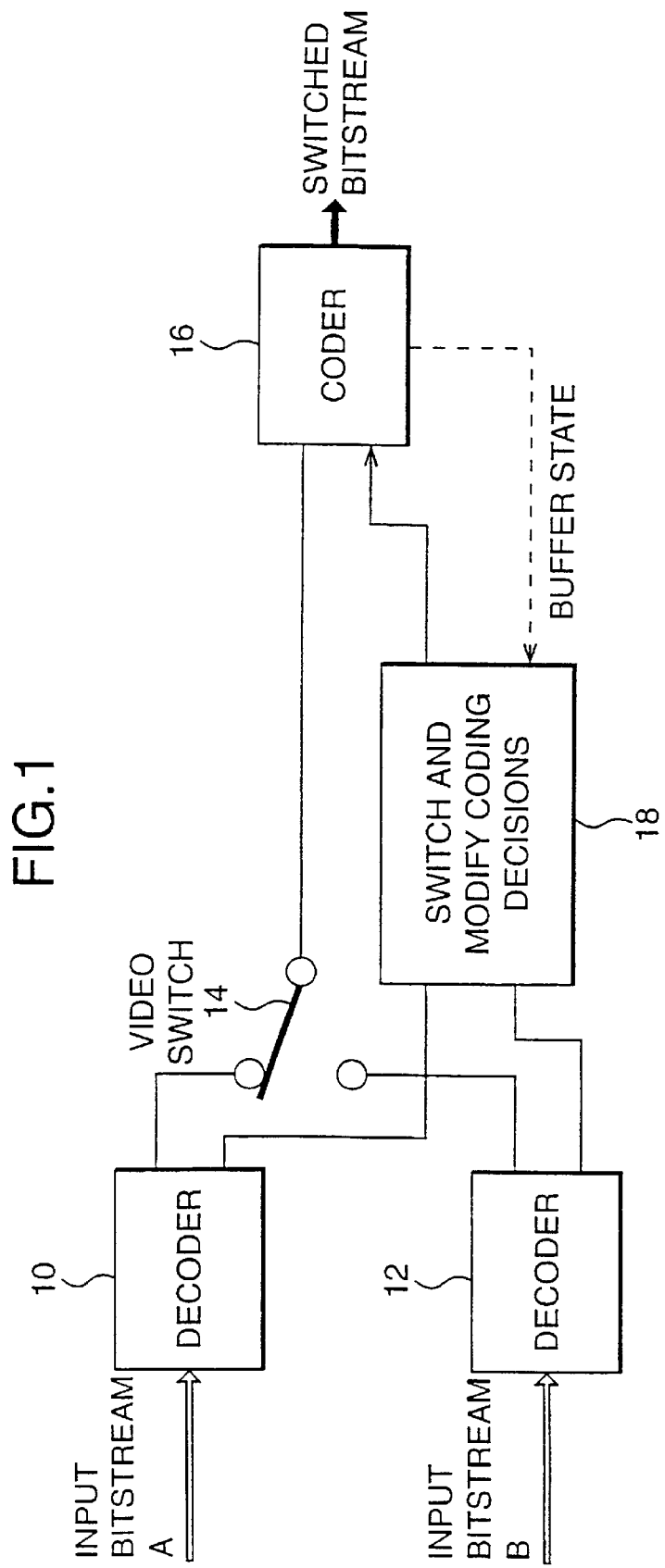
FIG. 1 is a block diagram of a switch according to the present invention.

FIG. 1 shows in block diagram form, apparatus for switching between two MPEG-2 video bitstreams, denoted in the figure as bitstream A and bitstream B. Two MPEG decoders 10 and 12 are provided. The two decoders each produce two outputs: a decoded video signal, and a coding decision signal. The coding decision signal contains all the relevant information about how the corresponding bitstream was coded that can be deduced from the bitstream. This information includes, but is not limited to, the following: picture dimensions; frame rate; picture structure (frame-coded or field-coded); picture type (I,P or B); whether macroblocks are intra-coded or use prediction; whether forward, backward or bi-directional prediction is used; motion vectors; quantiser visibility weighting matrices; quantiser step and buffer state of a downstream decoder.

The two decoded video signals are switched in video switch 14 as if they were conventional uncompressed signals and the output of the video switch is sent to a coder 16. This is a special sort of MPEG-2 coder that can make use of a coding decision signal as disclosed for example in EP0765576 or WO98/03017. This coder will reuse some or all of the decisions taken by the coder or coders that created the input bitstreams, as follows.

Block 18 serves to provide coding decisions to the coder 16. For frames far away from the switching point, all of the coding decisions are reused and block 18 merely serves to pass the coding decisions associated with decoding of bitstream A or bitstream B, as appropriate. Doing this causes the re-coding process to be near-transparent, i.e. the picture obtained by decoding the output bitstream is virtually indistinguishable from that which would be obtained by decoding the corresponding input bitstream For frames near the switch point, block 18 modifies coding decisions and the MPEG picture type may be changed on re-coding. The main purpose of this is to modify the refresh strategy to be more suitable for the switched bitstream. Typically an intra coded picture (I-picture) is used soon after the switch point, to prevent prediction from occurring "across the cut". More ingeniously, I-pictures in the input bitstreams may be "converted" to non-intra pictures (typically P-pictures), in order to prevent too many I-pictures coming in close succession, which could cause the short-term bit rate to be too high and underflow the buffer of a downstream decoder. Under some circumstances (for instance when there is a large amount of motion in the scene), an intra coded frame may be converted into an intra coded field followed by a forward coded field (to do this the MPEG-2 picture structure is converted from frame to field). This is an alternative method of reducing the short-term bitrate.

The example set out below shows a case where one picture in bitstream A, and two in bitstream B have had their picture type modified on re-coding. These pictures are shown in a bold typeface (for clarity, the pictures are shown in the order in which they are displayed at the decoder output, not the order in which they appear in the bitstream):

| | | | | | switch point | | | | | | | |
|---|---|---|---|---|---|---|---|---|---|---|---|---|
| Input A | P | B | B | I | . | . | . | . | . | . | . | . |
| Input B | . | . | . | . | B | P | B | B | I | B | B | P |
| Switched output | P | B | B | P | B | I | B | B | P | B | B | P |

The prediction mode and motion vectors are modified as necessary to take into account any change in picture type, and to prevent predictions from being made "across the cut". Often this involves a simplification; in the above example, the B-picture following the switch point would usually contain bi-directionally predicted macroblocks in input bitstream B, these are modified to be forward predicted, and the backward vectors discarded. However, where an I-picture is converted to a P-picture, new vectors will need to be estimated, unless MPEG-2 concealment vectors were available in the input bitstream.

The quantiser parameters are modified in order to control the number of bits produced on re-coding. This is typically done by the rate controller in any MPEG-2 coder, which monitors the buffer state of a downstream decoder (actually it monitors the state of its own output buffer, which mirrors that of the decoder buffer).

The rate controller for this invention differs from a conventional one in that the bit usage of the input bitstreams is conveyed via the coding decisions, and is used to set targets for the number of bits to be produced on re-coding. These targets are then used to determine the quantiser parameters. Also, over a number of frames following the switch point, the rate controller attempts to bring the buffer state of a downstream decoder to match what it would have been if bitstream B had been sent directly to the decoder. Typically the number of bits required is set to be slightly lower than the input bitstream. When the decoder buffer state matches, the rate controller enters a "locked" mode in which the quantiser parameters (as well as all other coding decisions) are kept exactly the same as in the input bitstream. After this point, the switch is virtually transparent. Due to an effect called "temporal masking", the level of noise in the pictures immediately before and after the switch point can often be allowed to be higher than at other times. The eye is distracted by the change in picture material and fails to notice the additional noise. Thus the number of bits used in these pictures may deliberately be made quite small, if this helps in making the buffer state match as above.

Although this specific description has focused on the switching of MPEG-2 bitstreams, many of the techniques are applicable for use with other types of DCT-based compressed video bitstreams, such as JPEG, ETSI and MPEG-1, or even non-DCT-based bitstreams, such as in wavelet or fractal-based systems.

The invention can easily be modified to cope with the case when switching between compressed and non-compressed inputs; here the coder makes use of the coding decisions in the compressed input, but makes its own decisions when the non-compressed input is selected.

The switch can be extended to incorporate a reduction in bitrate, in other words, the rate of the output bitstream is lower than one or both of the input bitstreams. For example, a lower bitrate may be used for transmission to the viewer than is used for distribution from the studio to the transmitter. In such cases, the switch is not intended to be transparent, and there is no need to attempt to match the downstream decoder's buffer state as above.

In addition to performing simple switches, other video transitions may be required. The most important of these is the cross-fade. MPEG coding of cross-fading sequences tends to give poor quality pictures; this is due to the difficulty in estimating motion vectors and poor performance of forward prediction. This invention can be extended to perform cross-fades.

For this purpose, the described video switch takes the form of a video cross-fading device. It will be recognised that during the fade, decisions from both input bitstreams are available for use in re-coding.

In one coding strategy, the decisions from bitstream A are used for the first part of the fade, and for the last part, the decisions from bitstream B are used. In an alternative strategy, the potential coding quality is assessed separately using each set of decisions, and the better set chosen.

Temporal masking is not appropriate, as there is no sudden change from one sequence to the other. However, the mixing of the sequences tends to decrease visibility of quantisation noise, and the rate controller of the coder can exploit this fact.

Some techniques of this invention can be used to precondition a transport stream as part of a splicing device.

Figure 2:
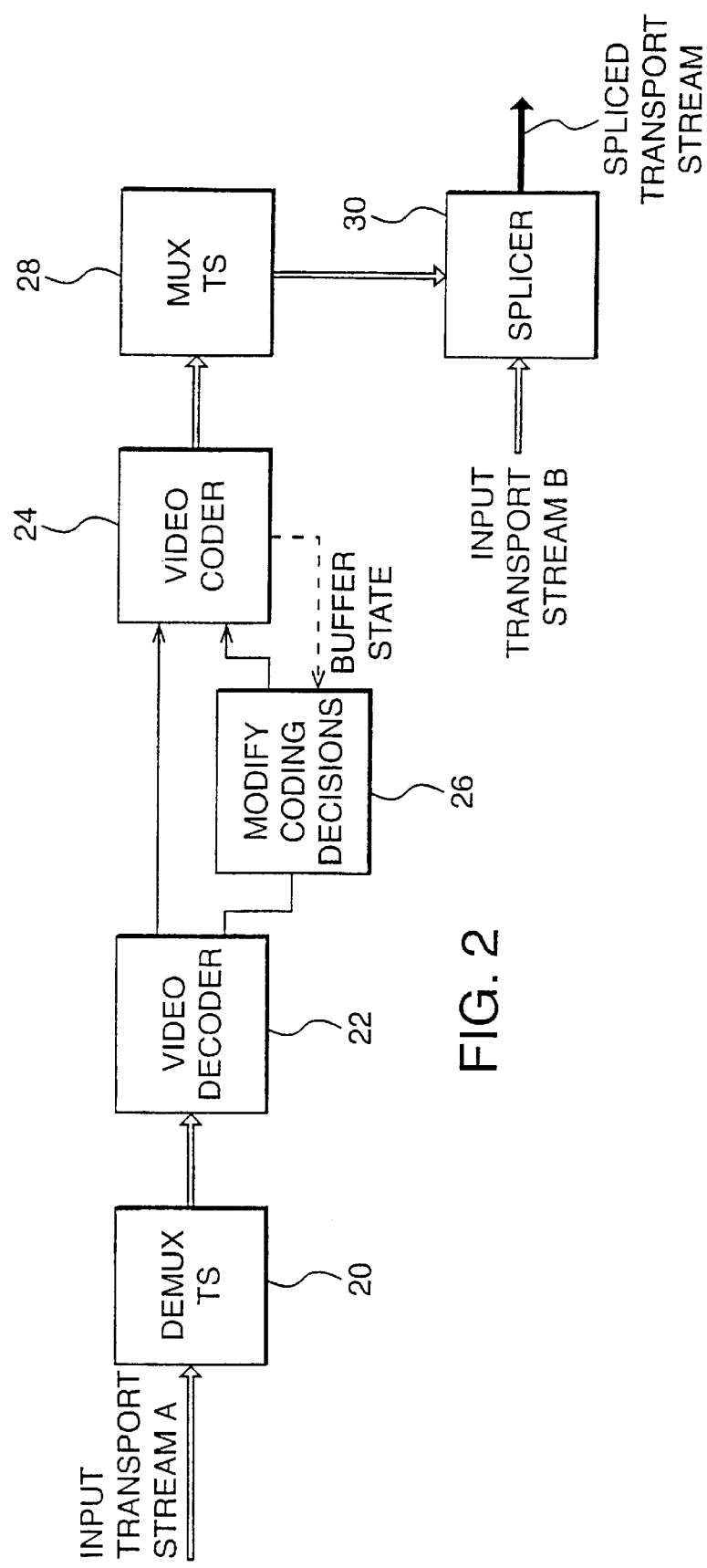
FIG. 2 is a block diagram of apparatus for preconditioning a bitstream for a splice.

Referring now to FIG. 2, this shows splicing from transport stream A to transport stream B. Transport stream A is demultiplexed in transport stream demultiplexer 20 to elementary bitstreams (for clarity, only the video bitstream is shown). The video bitstream is decoded to video in the decoder with coding decisions also being output. The video signal passes directly to a video coder 24 which also receives the coding decisions after they have passed through a "modify coding decisions" block 26. When many frames from a splice, the video is re-coded with the same decisions and remultiplexed in transport stream multiplexer 28; this will be transparent under normal conditions. Near the time of splicing in transport stream splicer 30, the number of bits produced will be adjusted to meet the buffer constraints for splicing, by modifying the coding decisions in block 6, typically by adjusting the quantiser parameters.

In addition to the above, the inputs must be synchronised to ensure that splicing occurs on the correct picture type, and modifications are required to the time stamps and clock reference information in the transport stream. These aspects are not shown in the above diagram.

Another possible embodiment of the present invention is a non-real-time edit conforming switch based in software. To speed up the operation of this, some modifications may be made to the essentially hardware approach described thus far. Bitstreams may be directly copied when the switch is effectively transparent. Only a partial decode—as far as the DCT domain—may be performed under some circumstances, provided that the picture type is not changed. This may lead to a small loss but acceptable loss in quality.

It should be understood that this invention has been described by way of examples only and that a wide variety of modifications are possible without departing from the scope of the invention.

What is claimed is:

1. An apparatus for the switching of compressed video bitstreams comprising: a first video compression decoder for receiving a first input compressed video bitstream and providing a first compression decoded video signal and a first coding decision signal, said first coding decision signal representing coding decisions taken in the compression of the first input compressed video bitstream; a second video compression decoder for receiving a second compressed video input bitstream and providing a second compression decoded video signal and a second coding decision signal, said second coding decision signal representing coding decisions taken in the compression of the second input compressed video bitstream; a video switch unit for switching between said first and second compression decoded video signals; coding decision processing means for receiving said first and second coding decision signals and outputting coding decisions and a video compression coder for receiving said coding decisions and re-coding said switched video signal utilizing said coding decisions, such that said coder and at least one of said first decode and said second decoder remain continuously in circuit, said decoding and re-coding being as a coder of said coding decisions, substantially transparent in the steady state.

2. An apparatus according to claim 1, wherein said coding decision signals convey information on some or all of the following parameters: picture dimensions; frame rate; picture structure (frame-coded or field-coded); picture type (I, P or B); whether macroblocks are intra-coded or use prediction; whether forward, backward or bi-directional prediction is used; motion vectors; quantiser visibility weighting matrices; quantiser step and buffer state of a downstream decoder.

3. An apparatus according to claim 1, wherein said coding decision processing means serves around a switching point to modify coding decisions for re-coding.

4. An apparatus according to claim 3, wherein said coding decision processing means serves around the switching point to re-code I-frames as P-frames, and vice versa.

5. An apparatus according to claim 3, wherein said coding decision processing means serves around the switching point to convert an intra coded frame into an intra coded field followed by a forward coded field.

6. An apparatus according to claim 1, wherein underflow of a downstream decoder buffer is avoided through reduction of bitrate for frames adjacent the switching point.

7. An apparatus according to claim 6, wherein the bitrate is reduced by permitting quantization noise to rise to a level just masked by the psycho-visual effect of a marked change in picture content.

8. An apparatus according to claim 1, wherein said coding decision processing means receives buffer occupancy information such that the bit usage in the input bitstreams is taken into account in the re-coders' rate control algorithm.

9. An apparatus according to claim 1, wherein the coder for re-coding said switched video signal passes into an unlocked rate control mode on switching and re-enters a locked mode, in which coding decisions are used directly, once the determined buffer state of a downstream decoder matches that applicable to a steady state of the switched video signal.

10. An apparatus according to claim 1, wherein said video switch unit is adapted to perform cross fades.

11. An apparatus according to claim 10, wherein the coder is adapted to use the first coding decisions in a first part of the fade and the second coding decisions in a second part of the fade.

12. An apparatus according to claim 10, wherein the potential coding quality is assessed with the coder using separately the first and the second coding decisions and a selection made of the set of coding decisions giving better coding quality.

13. An apparatus for preconditioning a bitstream for a splice comprising: a decoder for receiving and input bitstream and providing an decoded video signal and a coding decision signal; a coder for re-coding said video signal and outputting a bitstream preconditioned for a splice, and coding decision processing means for receiving said coding decision signal and delivering coding decisions to said coder, wherein said coding decision processing means serves around the intended splice point to modify coding decisions for re-coding.

14. An apparatus according to claim 13, wherein said coding decision signals convey information on some or all of the following parameters: picture dimensions; frame rate; picture structure (frame-coded or field-coded); picture type (I, P or B); whether macroblocks are intra-coded or use prediction; whether forward, backward or bi-directional prediction is used; motion vectors; quantiser visibility weighting matrices; quantiser step and buffer state of a downstream decoder.

15. An apparatus according to claim 13, wherein said coding decision processing means serves around the splice point to re-code I-frames as P-frames, and vice versa.

16. An apparatus according to claims 13, wherein said coding decision processing means serves around the splice point to convert and intra coded frame into an intra coded field followed by a forward coded field.

17. An apparatus according to claim 13 wherein underflow of a downstream decoder buffer is avoided through reduction of bitrate for frames adjacent the splice point.

18. An apparatus according to claim 17, wherein bitrate is reduced by permitting quantization noise to rise to a level just masked by the psycho-visual effect of a marked change in picture content.

19. A method for the switching of compressed video bitstreams, comprising the steps of decoding at least a first input bitstream and providing at least a first decoded signal and at least a first coding decision signal, said first coding decision signal representing coding decisions taken in the compression of the first input bitstream; switching between said first video signal and another video signal; and re-coding said switched video signal to provide continuously the bitstream output utilizing information from said first coding decision signal when the switched video signal results from decoding of the first input bitstream, with said re-coding being through re-use of said coding decisions substantially transparent in the steady state.

20. A method according to claim 19, wherein said input bitstreams are decoded to DCT coefficient level.

21. A method according to claim 19, wherein said input bitstreams are decoded to video signals.

22. A method according to claim 21, wherein said coding decision signals convey information on some or all of the following parameters: picture dimensions; frame rate; picture structure (frame-coded or field-coded); picture type (I, P or B); whether macroblocks are intra-coded or use prediction; whether forward, backward or bi-directional prediction is used; motion vectors; quantiser visibility weighting matrices; quantiser step and buffer state of a downstream decoder.

23. A method according to claim 21, wherein said coding decisions are modified around a switching point.

24. A method according to claim 23, wherein said coding decision processing means serves around the switching point to re-code I-frames as P-frames, and vice versa.

25. A method according to claim 23, wherein said coding decision processing means serves around the switching point to convert an intra coded frame into an intra coded field followed by a forward coded field.

26. A method according to claim 19, wherein underflow of a downstream decoder buffer is avoided through reduction of bitrate for frames adjacent a switching point.

27. A method according to claim 26, wherein bitrate is reduced by permitting quantization noise to rise to a level just masked by the psycho-visual effect of a marked change in picture content.

28. A method according to claim 19, comprising the further steps of decoding a second input bitstream and providing a second decoded signal and a second coding decision signal; switching between said first and second video signals; and re-coding said switched video signal utilizing information from said first and second coding decision signals to provide a continuous video output with said decoding and said re-encoding being substantially transparent in the steady state.

\* \* \* \* \*